United States Patent
Zhang et al.

(10) Patent No.: US 12,066,856 B2
(45) Date of Patent: Aug. 20, 2024

(54) FOLDABLE MECHANISM, DISPLAY DEVICE, AND ELECTRONIC EQUIPMENT

(71) Applicant: WUHAN CHINA STAR OPTOELECTRONICS SEMICONDUCTOR DISPLAY TECHNOLOGY CO., LTD., Hubei (CN)

(72) Inventors: Zhuo Zhang, Hubei (CN); Zikang Feng, Hubei (CN)

(73) Assignee: WUHAN CHINA STAR OPTOELECTRONICS SEMICONDUCTOR DISPLAY TECHNOLOGY CO., LTD, Hubei (CN)

( * ) Notice: Subject to any disclaimer, the term of this patent is extended or adjusted under 35 U.S.C. 154(b) by 351 days.

(21) Appl. No.: 17/274,200

(22) PCT Filed: Nov. 23, 2020

(86) PCT No.: PCT/CN2020/130885
§ 371 (c)(1),
(2) Date: Mar. 8, 2021

(87) PCT Pub. No.: WO2022/082921
PCT Pub. Date: Apr. 28, 2022

(65) Prior Publication Data
US 2022/0357769 A1 Nov. 10, 2022

(30) Foreign Application Priority Data
Oct. 21, 2020 (CN) .......................... 202011135535.1

(51) Int. Cl.
G06F 1/16 (2006.01)
G09F 9/30 (2006.01)
H04M 1/02 (2006.01)

(52) U.S. Cl.
CPC .......... G06F 1/1616 (2013.01); G06F 1/1652 (2013.01); G09F 9/301 (2013.01);
(Continued)

(58) Field of Classification Search
CPC ...... G06F 1/1616; G06F 1/1652; G09F 9/301; H04M 1/0249; H04M 1/0216; H04M 1/0268
See application file for complete search history.

(56) References Cited

U.S. PATENT DOCUMENTS 10,601,968 B1 * 3/2020 Koh .................... H04M 1/0222
10,606,318 B1 * 3/2020 Lin ..................... H04M 1/0268
(Continued)

FOREIGN PATENT DOCUMENTS

CN 109040398 A 12/2018
CN 110290235 A 9/2019
(Continued)

OTHER PUBLICATIONS

International Search Report in International application No. PCT/CN2020/130885, mailed on Jul. 20, 2021.
(Continued)

*Primary Examiner* — Rockshana D Chowdhury
*Assistant Examiner* — Martin Antonio Asmat Uceda
(74) *Attorney, Agent, or Firm* — PV IP PC; Wei Te Chung; Zhigang Ma

(57) ABSTRACT

A foldable mechanism, a display device, and an electronic equipment are provided. The foldable mechanism includes a first sub-mechanism and a second sub-mechanism. Through an asymmetric and complementary arrangement of the first sub-mechanism and the second sub-mechanism, the foldable mechanism includes a plurality of structures with different thicknesses, which can not only meet loading requirements of components of different thicknesses, but also reduce a (Continued)

thickness of an entire machine of the foldable mechanism after the foldable mechanism is folded, thereby reducing a thickness of an entire machine after folding the display device and the electronic equipment.

18 Claims, 13 Drawing Sheets

(52) U.S. Cl.
CPC ........ *H04M 1/0249* (2013.01); *H04M 1/0216* (2013.01); *H04M 1/0268* (2013.01)

(56) References Cited

U.S. PATENT DOCUMENTS

| | | | |
|---|---|---|---|
| 10,901,457 B2* | 1/2021 | Ou | H04M 1/0216 |
| 10,965,796 B2* | 3/2021 | Yang | H04M 1/0235 |
| 11,178,264 B2* | 11/2021 | Kim | H04M 1/0241 |
| 11,614,779 B2* | 3/2023 | Delaporte | G06F 1/1616 |
| | | | 361/679.01 |
| 2016/0070303 A1* | 3/2016 | Lee | G06F 1/1616 |
| | | | 361/679.27 |
| 2016/0165024 A1 | 6/2016 | Tan et al. | |
| 2019/0028579 A1* | 1/2019 | Cho | G06F 3/04886 |
| 2019/0320048 A1* | 10/2019 | Yang | G06F 1/1652 |
| 2019/0373743 A1 | 12/2019 | Liu | |
| 2020/0348729 A1* | 11/2020 | Koh | H04M 1/0214 |
| 2020/0366770 A1* | 11/2020 | Kim | H04M 1/0241 |
| 2021/0116963 A1* | 4/2021 | Moon | G06F 1/1681 |

FOREIGN PATENT DOCUMENTS

| | | |
|---|---|---|
| CN | 111081153 A | 4/2020 |
| CN | 111835899 A | 10/2020 |
| CN | 211702082 U | 10/2020 |
| CN | 213342300 U | 6/2021 |

OTHER PUBLICATIONS

Written Opinion of the International Search Authority in International application No. PCT/CN2020/130885, mailed on Jul. 20, 2021.

Chinese Office Action issued in corresponding Chinese Patent Application No. 202011135535.1 dated Jun. 27, 2024, pp. 1-7.

* cited by examiner

FOLDABLE MECHANISM, DISPLAY DEVICE, AND ELECTRONIC EQUIPMENT

FIELD OF INVENTION

The present invention relates to the field of display technologies, in particular to the field of foldable mechanism technologies, and in particular to a foldable mechanism, a display device, and an electronic equipment.

BACKGROUND OF INVENTION

At present, foldable mobile phones equipped with flexible screens have become a new trend in mobile phone markets. Among them, outward folding mobile phones are widely favored with high screen utilization. However, due to limitations of thicknesses of terminal systems (system board, battery, etc.) and limitations of bending ability of flexible screens, a thickness of single-layer housings of general outward folding flexible display mobile phones is greater than 5.5 mm when they are flattened, and a total thickness after bending is greater than 11 mm. In this folded state, an overall thickness of the outward folding flexible display mobile phones is greater than an overall thickness of ordinary straight-board mobile phones, which is not conducive to forming a competitive advantage in markets.

In view of this, there is a need for an outward folding foldable mechanism that can carry required components of mobile phones while effectively reducing an overall thickness when folded to achieve a thinness comparable to, or even surpassing, an overall thickness of ordinary straight mobile phones.

Technical Problem

The present invention provides a foldable mechanism, a display device, and an electronic equipment, solving a problem that an overall thickness of an outward folding foldable mechanism after folding is too large, which causes inconvenience to carry.

Technical Solution

In a first aspect, the present invention provides a foldable mechanism comprising a first sub-mechanism and a second sub-mechanism. The first sub-mechanism has a first structure and a first boss having a first thickness, wherein the first structure comprises at least a first slope.

The second sub-mechanism has a second structure that is asymmetrical and complementary to the first structure, wherein the second structure is rotatably connected to the first structure. Wherein when the foldable mechanism is in an unfolded state, a plane formed by a front surface of the first boss, a front surface of the first structure, and a front surface of the second structure is configured to attach a flexible display screen, and the first structure is located between the first boss and the second structure; and when the first structure and the second structure are turned toward an opposite side of the front surface of each other to a folded state, a sum of a thickness of the first structure and a thickness of the second structure is less than or equal to the first thickness.

Based on the first aspect, in a first embodiment of the first aspect, the first structure comprises a second boss having a second thickness; and the second boss is located between the first boss and the first slope, and the second thickness is less than the first thickness.

Based on the first embodiment of the first aspect, in a second embodiment of the first aspect, the first structure further comprises a third boss having a third thickness; and the third boss is located between the first slope and the second structure, and the third thickness is less than the second thickness.

Based on the first embodiment of the first aspect, in a third embodiment of the first aspect, the second thickness ranges from 2 mm to 8 mm.

Based on the first aspect, in a fourth embodiment of the first aspect, the first boss is provided with a retreat adjacent to the first structure.

Based on the first aspect, in a fifth embodiment of the first aspect, the first sub-mechanism has a first magnet, the second sub-mechanism has a second magnet, and a polarity of the first magnet is different from a polarity of the second magnet.

Based on the first aspect, in a sixth embodiment of the first aspect, the first thickness is less than or equal to 9 mm.

In a second aspect, the present invention provides a display device, which comprises the foldable mechanism in any of the above embodiments. The display device comprises at least two states: a first state-the folded state when the first sub-mechanism and the second sub-mechanism are rotated toward the opposite side of the front surface of each other; and a second state-the unfolded state when the first sub-mechanism and the second sub-mechanism are rotated away from the opposite side of the front surface of each other; wherein an area of the display device in the unfolded state is greater than an area of the display device in the folded state.

Based on the second aspect, in a first embodiment of the second aspect, when the display device is in the folded state, the first structure and the second structure overlap each other.

In a third aspect, the present invention provides an electronic equipment, which comprises a flexible display screen and the foldable mechanism in any of the above embodiments, wherein the flexible display screen is attached to a front surface and a side surface of the foldable mechanism.

BENEFICIAL EFFECT

A foldable mechanism, a display device, and an electronic equipment provided by the present invention, through an asymmetric and complementary arrangement of a first sub-mechanism and a second sub-mechanism, the foldable mechanism comprises a plurality of structures with different thicknesses, which can not only meet loading requirements of components of different thicknesses, but also reduce a thickness of an entire machine of the foldable mechanism after the foldable mechanism is folded, thereby reducing a thickness of an entire machine after folding the display device and the electronic equipment, which is beneficial to improve portability of the entire machine and enhance competitiveness of the entire machine.

DESCRIPTION OF DRAWINGS

In order to illustrate embodiments or technical solutions more clearly in the prior art, a brief introduction of the drawings used in the embodiments or the prior art description will be briefly described below. Obviously, the drawings in the following description are only some of the embodiments of the invention, and those skilled in the art can obtain other drawings according to the drawings without any creative work.

DETAILED DESCRIPTION OF PREFERRED EMBODIMENTS

Figure 1:
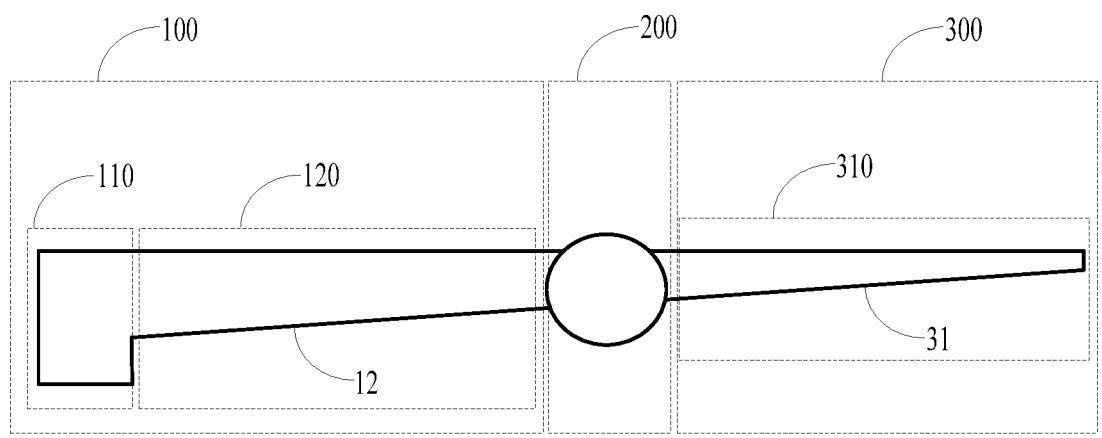
Figure 2:
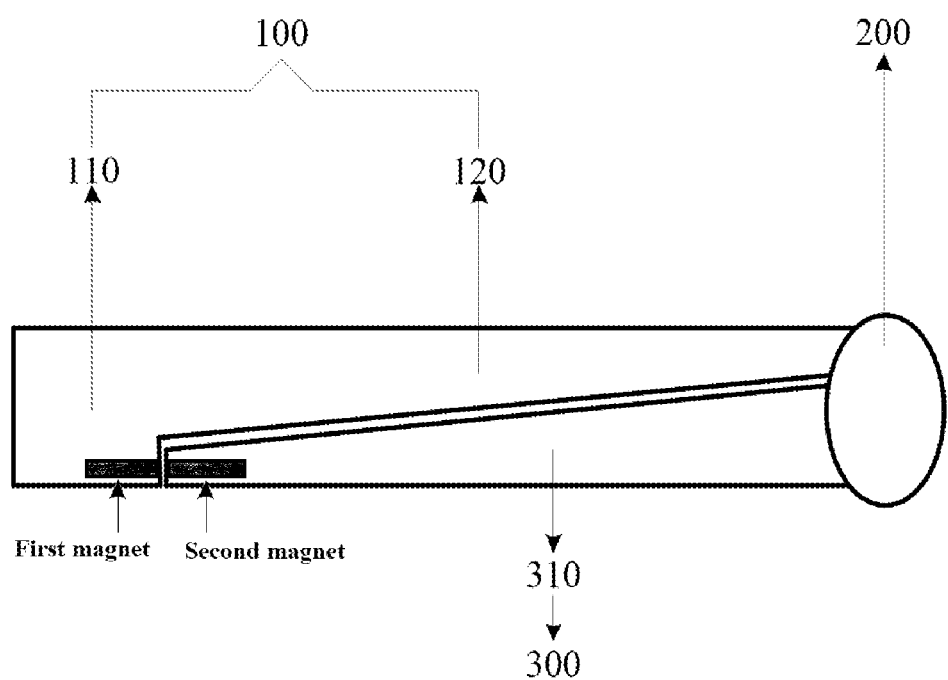
FIG. 2 is a schematic view of the first configuration of the foldable mechanism provided by an embodiment of the present invention when it is in a folded state.
Figure 3:
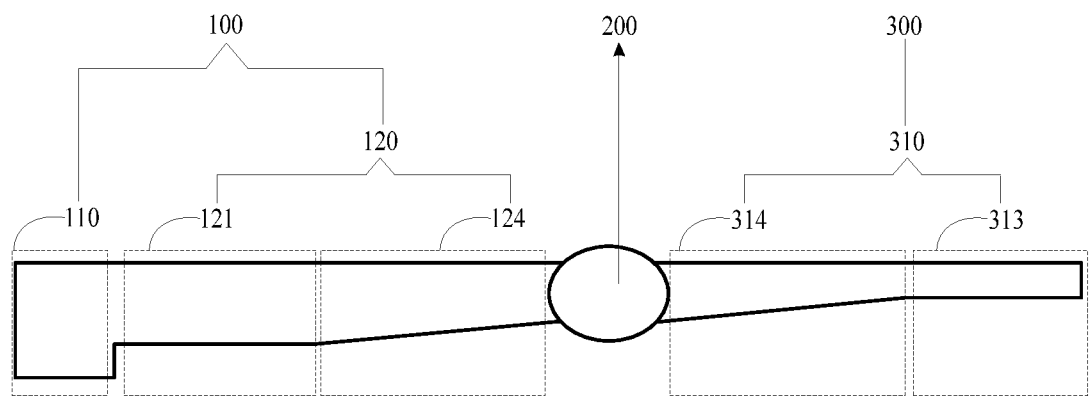
FIG. 3 is a schematic view of a second configuration of the foldable mechanism provided by an embodiment of the present invention when it is in an unfolded state.
Figure 4:
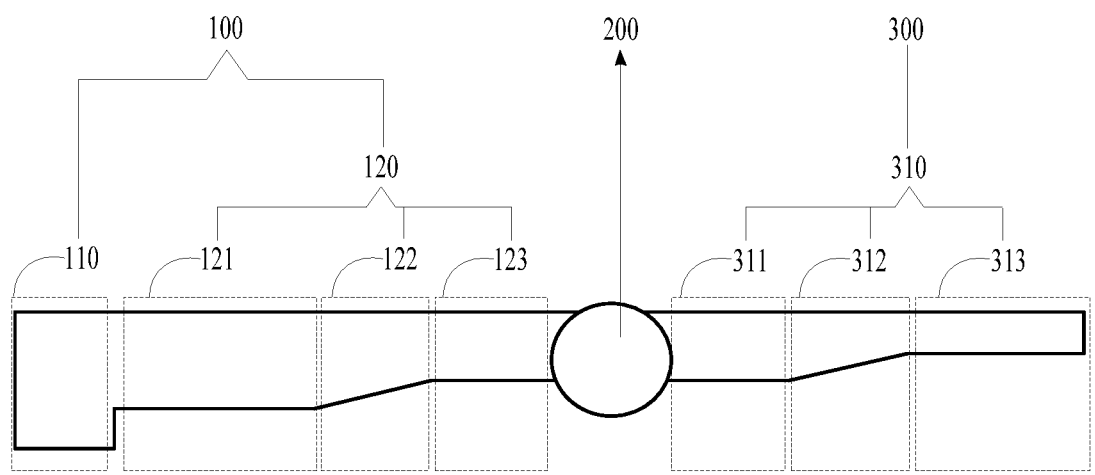
FIG. 4 is a schematic view of a third configuration of the foldable mechanism provided by an embodiment of the present invention when it is in an unfolded state.
Figure 5:
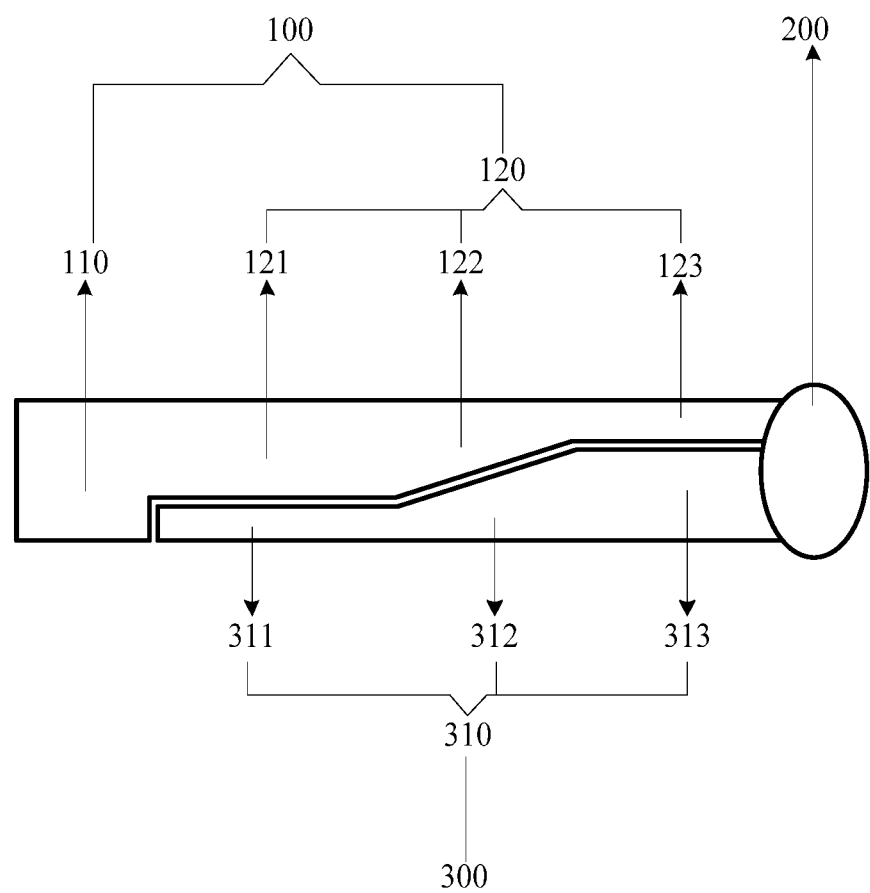
FIG. 5 is a schematic view of the third configuration of the foldable mechanism provided by an embodiment of the present invention when it is in a folded state.

Please refer to FIG. 1 to FIG. 7. FIG. 1 is a schematic view of a first configuration of a foldable mechanism provided by an embodiment of the present invention when it is in an unfolded state. FIG. 2 is a schematic view of the first configuration of the foldable mechanism provided by an embodiment of the present invention when it is in a folded state. FIG. 3 is a schematic view of a second configuration of the foldable mechanism provided by an embodiment of the present invention when it is in an unfolded state. FIG. 4 is a schematic view of a third configuration of the foldable mechanism provided by an embodiment of the present invention when it is in an unfolded state. FIG. 5 is a schematic view of the third configuration of the foldable mechanism provided by an embodiment of the present invention when it is in a folded state. This embodiment provides a foldable mechanism, which comprises a first sub-mechanism 100 and a second sub-mechanism 300. The first sub-mechanism 100 has a first structure 120 and a first boss 110 having a first thickness, and the first structure 120 comprises at least a first slope. Please refer to FIG. 1. Currently, the first structure 120 only comprises a first slope 12. The second sub-mechanism 300 has a second structure 310 that is asymmetrical and complementary to the first structure 120, and the second structure 310 is rotatably connected to the first structure 120. Wherein when the foldable mechanism is in an unfolded state, a plane formed by a front surface of the first boss 110, a front surface of the first structure 120, and a front surface of the second structure is configured to attach a flexible display screen, and the first structure 120 is located between the first boss 110 and the second structure 310, and when the first structure 120 and the second structure 310 are turned toward an opposite side 140 of the front surface of each other to a folded state, a sum of a thickness of the first structure 120 and a thickness of the second structure 310 is less than or equal to the first thickness.

First Embodiment

In order to make the purpose, technical solutions, and effects of the present invention clearer and more explicit, hereinafter, the present invention will be will be further described in detail with reference to the accompanying drawings and embodiments. It should be understood that the specific embodiments described herein are only used to explain the present invention, not to limit the present invention.

It should be noted that the above-mentioned foldable mechanism at least has a front surface 130 and a rear surface 140 in a thickness direction. That is, in the thickness direction of the foldable mechanism, one side of the foldable mechanism is the front surface 130, and the opposite side of the foldable mechanism is the rear surface 140. The front surface 130 is used to attach the flexible display screen, and the rear surface 140 is used to fold the foldable mechanism. When the foldable mechanism is in the folded state, the rear surface 140 of the first structure 120 and the second structure 310 are in contact with each other.

It can be understood that the first structure 120 and the second structure 310 are rotatably connected, and the rotatable connection can be achieved by a rotating shaft 200 or a flexible bendable connector.

It should be noted that a maximum thickness of the first slope comprised in the first structure 120 is less than the first thickness of the first boss 110, and a portion having the maximum thickness of the first slope is in contact with the first boss 110. In a direction where the first slope approaches the second structure 310, a thickness of the first slope gradually decreases. Based on an asymmetric and complementary relationship between the first structure 120 and the second structure 310, the second structure 310 now has a second slope 31. In a direction where the second slope 31 approaches the first structure 120, a thickness of the second slope 31 gradually increases. In the embodiment, the second structure 310 merely comprises the second slope 31. When the foldable mechanism is in the folded state, the sum of the thickness of the first structure 120 and the second structure 310 is equal to or approximately equal to the first thickness. It is understandable that through an asymmetric and complementary structural design between the first boss 110, the first structure 120, and the second structure 310, the foldable mechanism comprises a plurality of structures with different thicknesses, and required terminal systems can be placed in the foldable mechanism in a rational way according to the thickness. For example, a system board or battery with a larger thickness in the terminal system can be built into the first boss 110 having the first thickness, and other devices with a smaller thickness are built into a structure with a corresponding thickness in the foldable mechanism, and then the foldable mechanism can not only realize a minimization of the thickness in the folded state, but also complete a function of carrying functional devices, which greatly improves portability of the foldable mechanism.

It should be noted that a width of the first boss 110 is less than a width of the first structure 120 or the second structure 310. The width of the first structure 120 and the width of the second structure 310 may be, but not limited to, equal, or approximately equal, and are symmetrical in width with a center of the rotating shaft 200 or the flexible bendable connector.

Second Embodiment

Please refer to FIG. 3, a difference from the first embodiment is that the first structure 120 further comprises a second boss 121 having a second thickness. The second boss 121 is located between the first boss 110 and the first slope 12, and the second thickness is less than the first thickness. It should be noted that in the embodiment, the second boss 121 can be used to replace a corresponding portion of the first slope 12 adjacent to the first boss 110 in the first embodiment, so that the first slope 12 of the corresponding portion is configured as the second boss 121, and the remaining first slope 12 is configured as a third slope 124. In other words, the third slope 124 may be a portion of the first slope 12. Correspondingly, the second structure 310 comprises a fourth boss 313 that is asymmetric and complementary to the second boss 121 and a fourth slope 314 that is asymmetric and complementary to the third slope 124. A width of the fourth boss 313 and a width of the second boss 121 are the same, and when the second boss 121 and the fourth boss 313 are in the folded state of the foldable mechanism, the second boss 121 and the fourth boss 313 are in an overlapping state, and a sum of thicknesses of the second boss 121 and the fourth boss 313 is equal to or approximately equal to the first thickness. A width of the third slope 124 is the same as or similar to a width of the fourth slope 314. When the third slope 124 and the fourth slope 314 are in the folded state, the third slope 124 and the fourth slope 314 overlap each other, and a sum of thickness of the third slope 124 and the fourth slope 314 is equal to or approximately equal to the first thickness. It is also possible that the first structure 120 adds the second boss 121 between the first boss 110 and the first slope 12, and correspondingly, the second structure 310 performs corresponding asymmetric and complementary structural adjustments.

It is understandable that the embodiment provides a foldable mechanism design with richer thickness. Therefore, for various functional devices that the foldable mechanism should carry, there are more position options, which provide greater freedom for arrangements of the functional devices in the foldable mechanism.

Third Embodiment

As shown in FIG. 4 to FIG. 5, a difference from the second embodiment is that the first structure 120 in the embodiment further comprises a third boss 123 having a third thickness. The third boss 123 is located between the first slope 12 and the second structure 310, and the third thickness is less than the second thickness.

It should be noted that the embodiment can, but is not limited to, replace a portion of the first slope 12 adjacent to the second structure 310 with the third boss 123. At this time, the first slope 12 located between the second boss 121 and the third boss 123 is configured as a fifth slope 122. A slope of the fifth slope 122 is the same or different from a slope of the first slope 12, and the slope of the fifth slope 122 is determined by a thickness difference between the second boss 121 and the third boss 123. Correspondingly, the second structure 310 comprises a fourth boss 313, a sixth slope 312, and a fifth boss 311. When the first structure 120 and the second structure 310 are in the folded state, the fourth boss 313 overlaps the second boss 121, the fifth slope 122 overlaps the sixth slope 312, the fifth boss 311 overlaps the third boss 123, and a thickness of each overlap is equal to or approximately equal to the first thickness. A slope of the sixth slope 312 depends on a thickness difference between the fourth boss 313 and the fifth boss 311, and it is the same or different from the slope of the fourth slope or the second slope 31. The first structure 120 can also add the third boss 123 at a position adjacent to the second structure 310. Correspondingly, the second structure 310 performs corresponding asymmetric and complementary structural adjustments.

It is understandable that the embodiment further provides the foldable mechanism design with richer thickness. Therefore, for the various functional devices that the foldable mechanism should carry, there are more position options, which provide the greater freedom for the arrangements of the functional devices in the foldable mechanism.

It should be noted that the corresponding slope in each embodiment of the present invention is formed by continuously changing its thickness. For example, it can be, but not limited to, the thickness becomes smaller, or the thickness becomes larger. The corresponding bosses in each embodiment of the present invention are constructed and shaped with the same thickness or similarity.

In one of the embodiments, the second thickness can be, but is not limited to, ranging from 2 mm to 8 mm, and specifically can also be any one of 5 mm, 6 mm, and 7 mm.

In one of the embodiments, the first thickness may be less than or equal to 9 mm, specifically, it may also be any one of 8.5 mm, 8 mm, 7.5 mm, 7 mm, 6.5 mm, 6 mm, and 5 mm.

In one of the embodiments, the first sub-mechanism 100 has a first magnet, the second structure 310 has a second magnet, and a polarity of the first magnet is different from a polarity of the second magnet. It is understandable that when the first sub-mechanism 100 and the second sub-mechanism 300 are in the folded state, due to a mutual attraction of the first magnet and the second magnet, even if the foldable mechanism is placed in a container such as a pocket, a backpack, a handbag, etc., the first sub-mechanism 100 and the second sub-mechanism 300 can be folded more stably, which reduces a force-receiving area in the container and reduces a risk of being squeezed, and also keeps the space they occupy smaller and improves portability.

Figure 7:
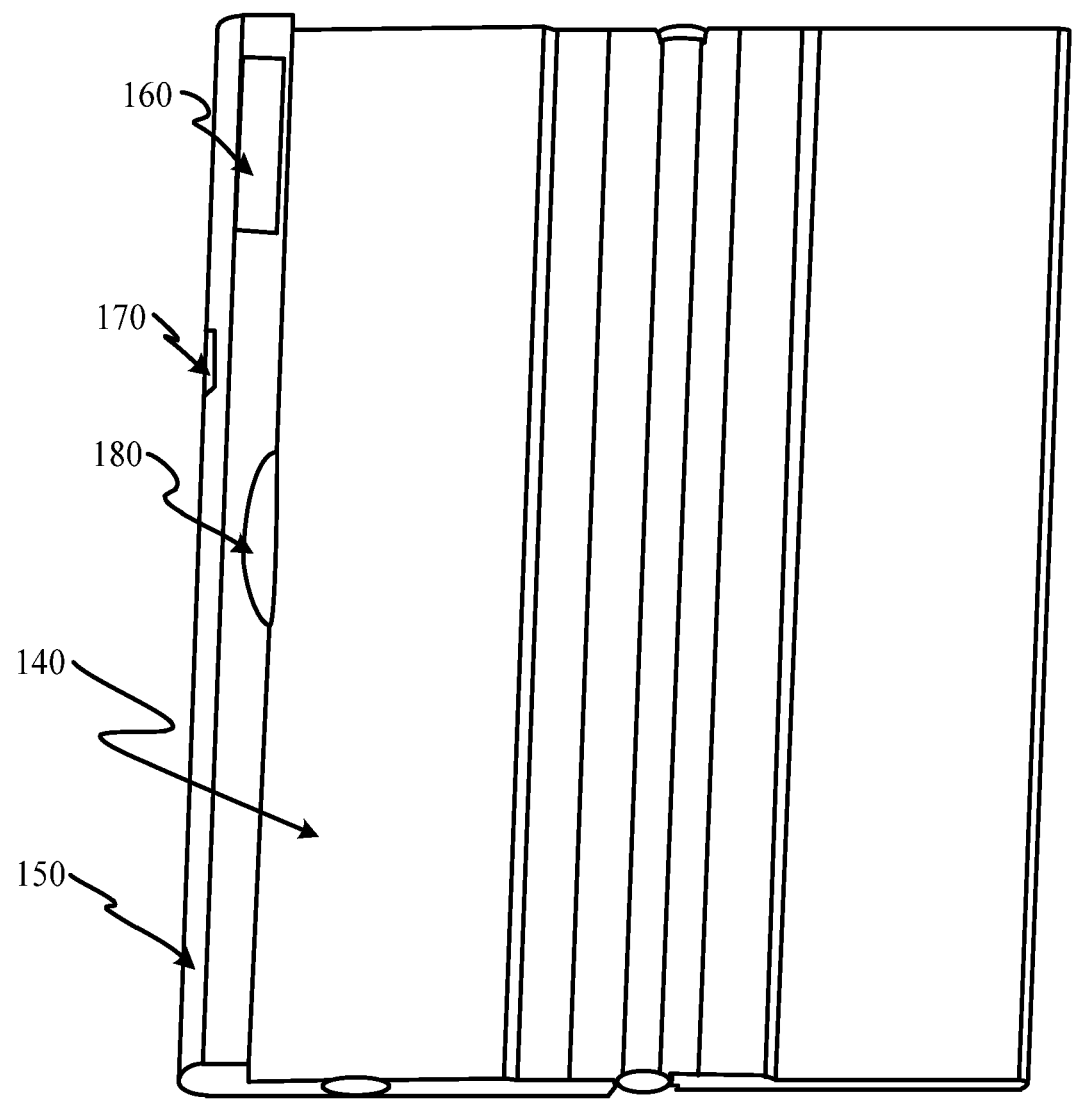
FIG. 7 is a schematic view of a rear surface and a side surface of the foldable mechanism provided by an embodiment of the present invention when it is in the unfolded state.
Figure 9:
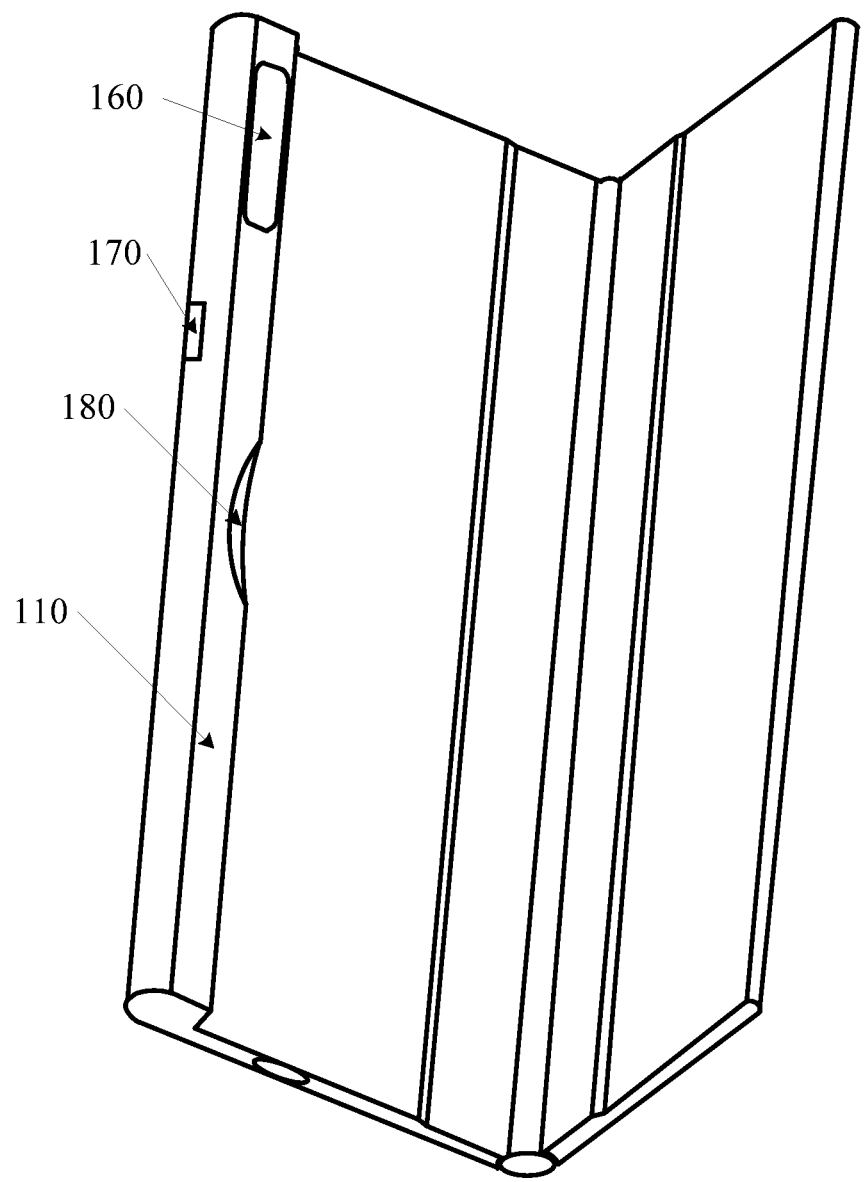
FIG. 9 is a schematic structural view of the rear surface of the foldable mechanism provided by an embodiment of the present invention when it is folded with the 90-degree included angle.

As shown in FIG. 7 and FIG. 9, in one of the embodiments, the first boss 110 is provided with a retreat 180 adjacent to the first structure 120. Specifically, the retreat 180 is located at a middle position of the first boss 110 in a length direction, and its shape matches with fingers of a human body. Specifically, it can match a shape of the human thumb. When the foldable mechanism needs to be opened from the folded state, the first structure 120 can be separated from the second structure 310 by entering the retreat 180 with a finger, which improves convenience of use. Moreover, a separation method is simple, which can reduce a complexity and cost of a manufacturing process, and is more concealed than a separation method or an opening method of a button decoupling, and can reduce maloperations. For example, this type of opening which is not easy to be squeezed by external forces instead of an opening method that comes from human consciousness.

As shown in FIG. 7 and FIG. 9, in one of the embodiments, an end of the first boss 110 is provided with a long strip camera 160 with round corners, and the camera 160 is located on an opposite side of the first boss 110.

As shown in FIG. 7 and FIG. 9, in one of the embodiments, the side surface 150 of the first boss 110 is provided with a switch 170, and the switch 170 is located between the camera 160 and the retreat 180 in a length direction of the first boss 110.

As shown in FIG. 6 to FIG. 13, in one of the embodiments, the present invention provides a display device, which comprises the foldable mechanism in any of the embodiments. The display device comprises at least two states: a first state of the folded state when the first sub-mechanism 100 and the second sub-mechanism 300 are folded inwardly; and a second state of the unfolded state when the first sub-mechanism 100 and the second sub-mechanism 300 are folded outward to form a plane or approximately a plane; wherein an area of the display device in the unfolded state is greater than an area of the display device in the folded state.

Figure 8:
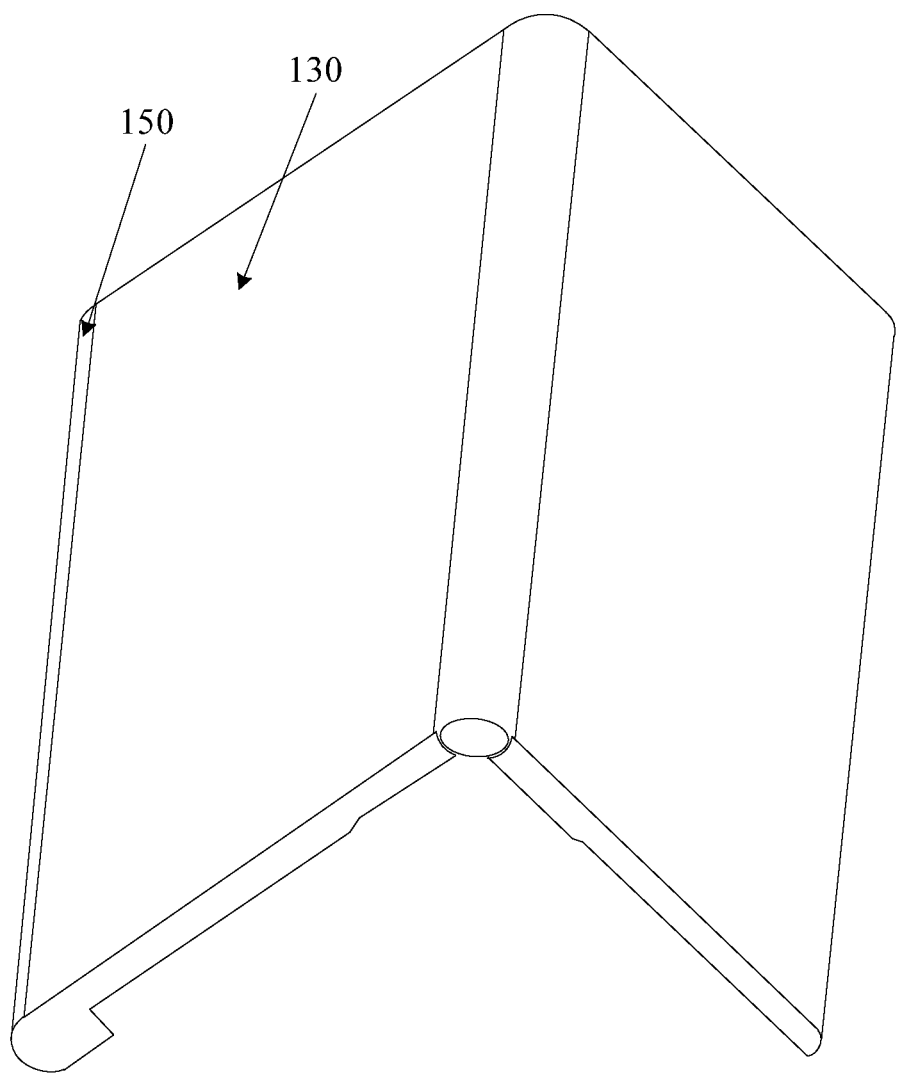
FIG. 8 is a schematic structural view of a front surface and the side surface of the foldable mechanism provided by an embodiment of the present invention when it is folded with a 90-degree included angle.
Figure 10:
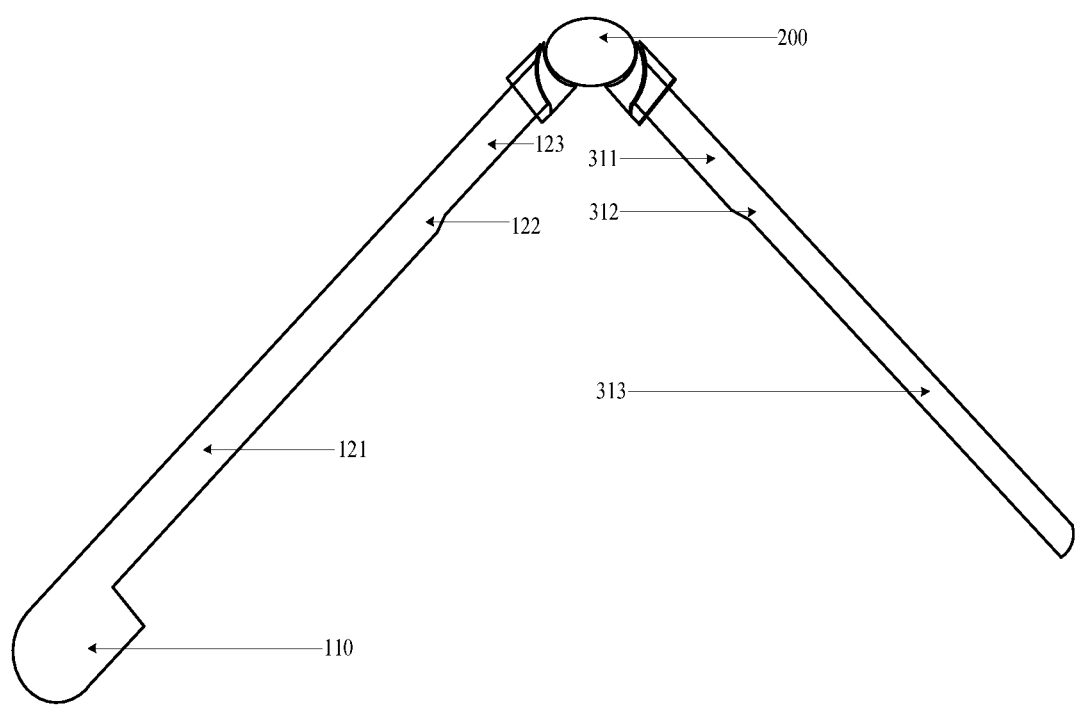
FIG. 10 is a schematic structural view of a cross section of the foldable mechanism provided in the embodiment of the present invention when it is folded with the 90-degree included angle.

The foldable mechanism comprises various incomplete folded states between the folded state and the unfolded state, for example, the incomplete folded state at an angle of 90 degrees in FIG. 8 to FIG. 10.

Figure 6:
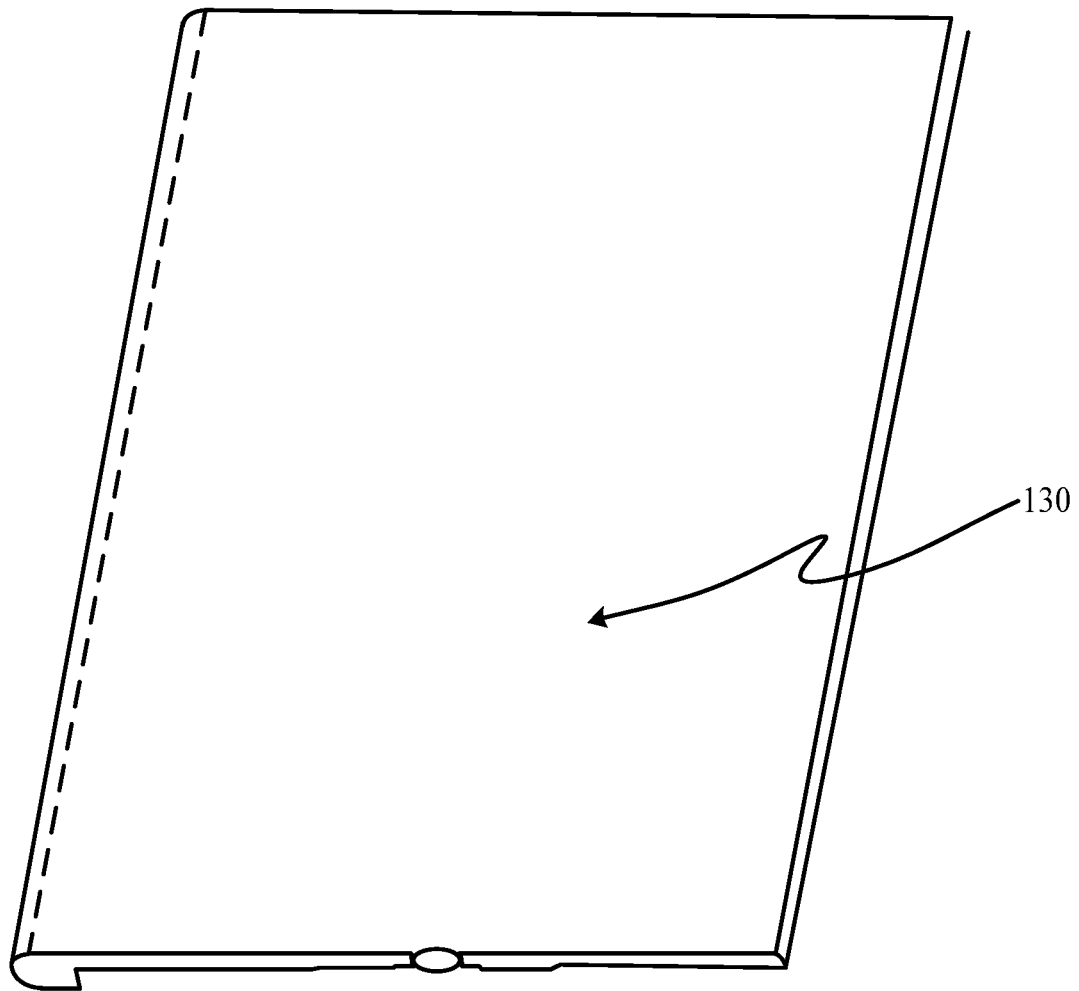
FIG. 6 is a schematic front view of the foldable mechanism provided by an embodiment of the present invention when it is in the unfolded state.
Figure 11:
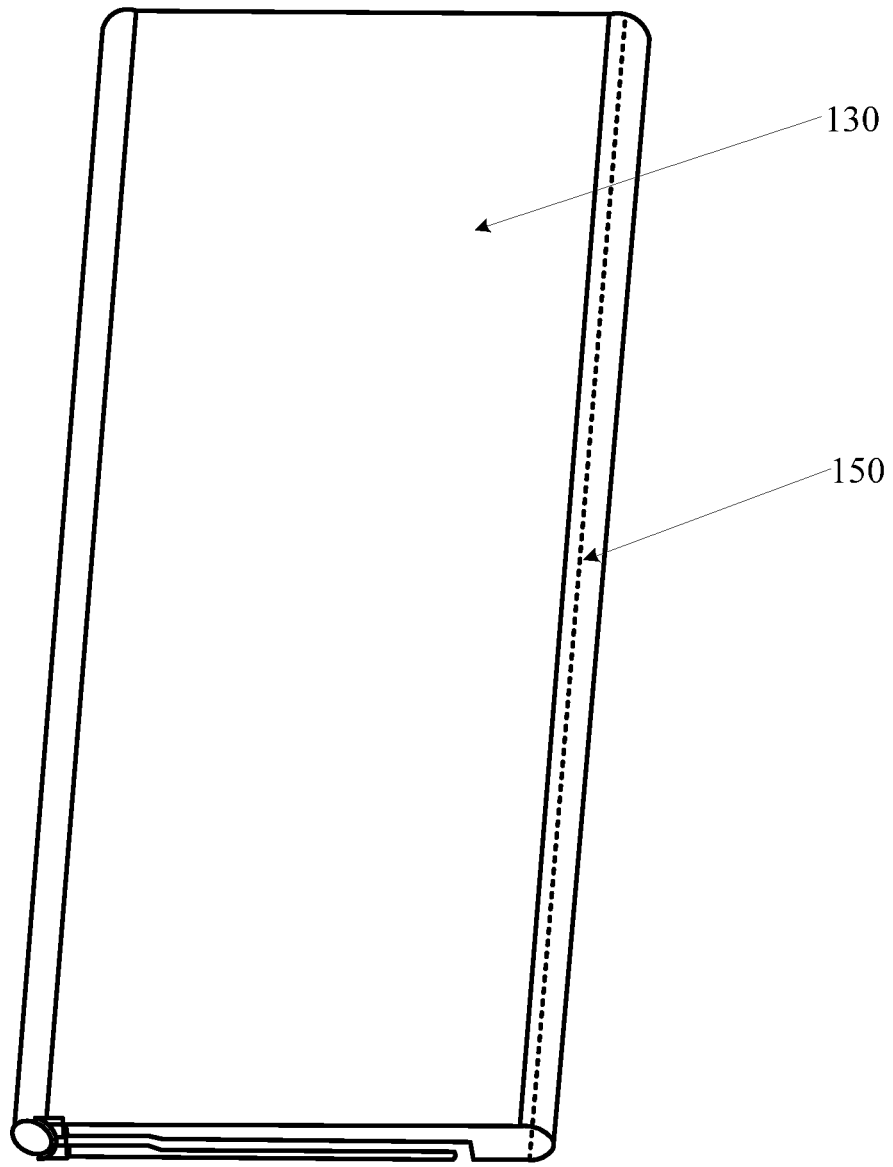
FIG. 11 is a schematic view of the third structure of the foldable mechanism provided by the embodiment of the present invention when it is in the folded state.
Figure 12:
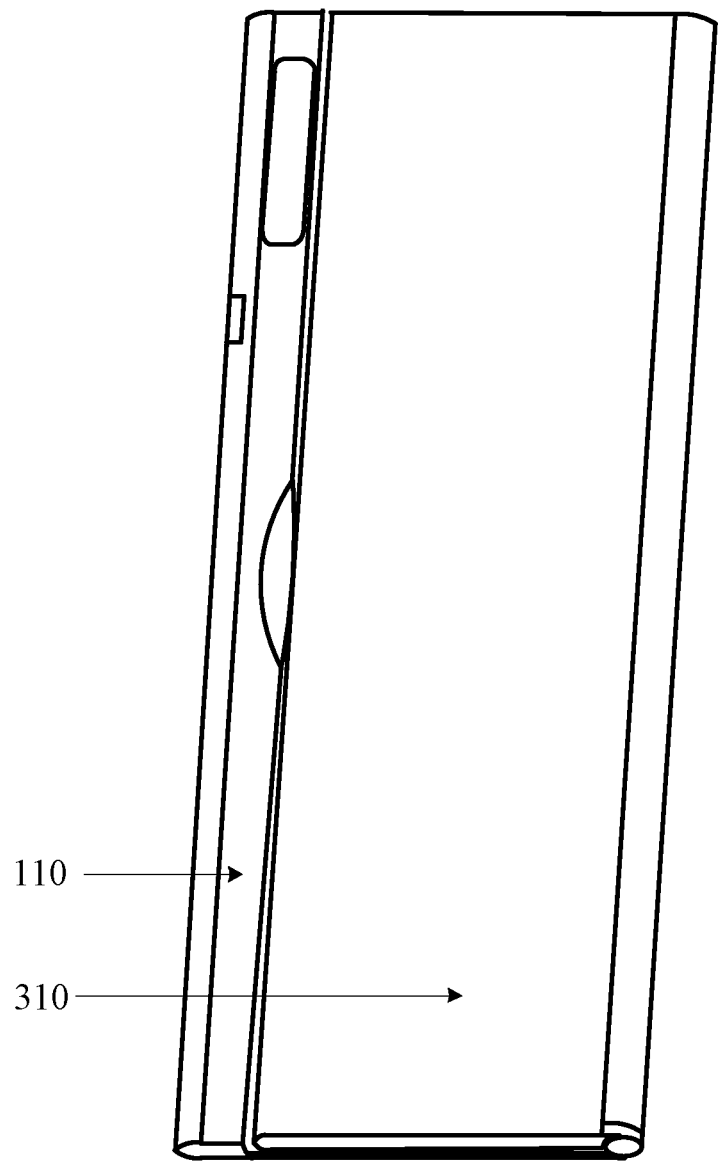
FIG. 12 is a schematic view of a fourth structure of the foldable mechanism provided by the embodiment of the present invention when it is in a folded state.
Figure 13:
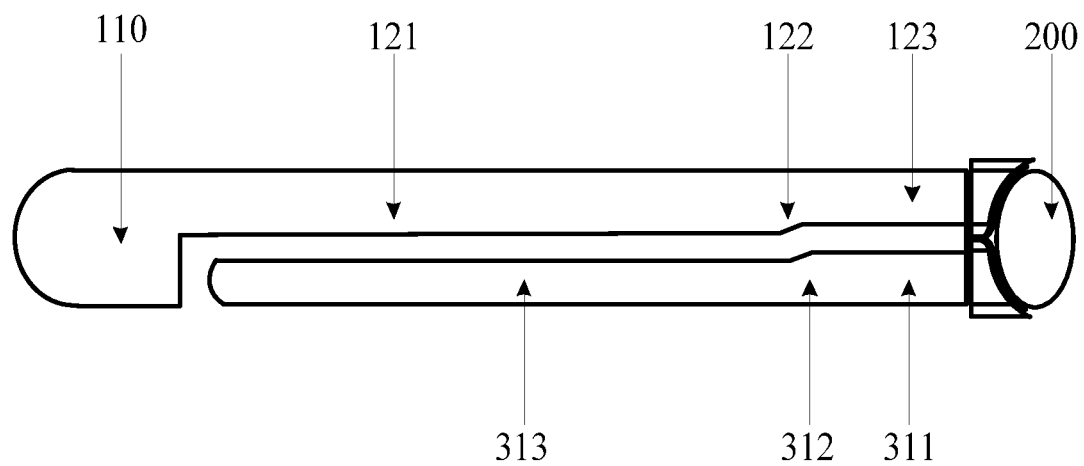
FIG. 13 is a schematic structural view of the cross section of the foldable mechanism provided by the embodiment of the present invention when it is in the folded state.

As shown in FIG. 11, FIG. 12, and FIG. 13, when the display device is in the folded state, the first structure 120 and the second structure 310 overlap each other. As shown in FIG. 6, when the display device is in the unfolded state, the first structure 120 and the second structure 310 of the front surface 130 form or approximately form a plane, which can maximize a plane display.

As shown in FIG. 6 to FIG. 7, in one of the embodiments, the present invention provides an electronic equipment, which comprises a flexible display screen and the foldable mechanism in any of the above embodiments. The flexible display is attached to the front surface 130 and the side surface 150 of the foldable mechanism. The side surface 150 of the foldable mechanism is located between the front surface 130 and the rear surface 140.

It should be noted that the side surface 150 of the foldable mechanism can be, but not limited to, an arc shape, or a curved shape. Due to an attachment of the flexible display screen, a display area of the electronic equipment extends from the front surface 130 to the side surface 150, and a width of the electronic equipment has almost zero frame, which has a higher screen-to-body ratio than a hard-curved screen.

It is understandable that for those of ordinary skill in the art, equivalent replacements or changes can be made according to the technical solution of the present invention and its inventive concept, and all these changes or replacements shall fall within the protection scope of the appended claims of the present invention.

What is claimed is:

1. A foldable mechanism, comprising:
   a first sub-mechanism having a first structure and a first boss having a first thickness, wherein the first structure comprises at least a first slope, a portion having a maximum thickness of the first slope is in contact with the first boss, and a thickness of the first slope gradually decreases in a direction where the first slope approaches the second structure; and
   a second sub-mechanism having a second structure that is asymmetrical and complementary to the first structure, wherein the second structure is rotatably connected to the first structure, the second structure comprises at least a second slope, and a thickness of the second slope gradually increases in a direction where the second slope approaches the first structure;
   wherein when the foldable mechanism is in an unfolded state, a plane formed by a front surface of the first boss, a front surface of the first structure, and a front surface of the second structure is configured to attach a flexible display screen, and the first structure is located between the first boss and the second structure; and
   when the first structure and the second structure are turned toward an opposite side of the front surface of each other to a folded state, a sum of a thickness of the first structure and a thickness of the second structure is less than or equal to the first thickness;
   wherein the first structure further comprises a second boss having a second thickness; and the second boss is located between the first boss and the first slope, the second thickness is equal to the maximum thickness of the first slope, and the maximum thickness of the first slope is less than the first thickness.

2. The foldable mechanism according to claim 1, wherein the first structure further comprises a third boss having a third thickness; and
   the third boss is located between the first slope and the second structure, and the third thickness is less than the second thickness.

3. The foldable mechanism according to claim 1, wherein the second thickness ranges from 2 mm to 8 mm.

4. The foldable mechanism according to claim 1, wherein the first boss is provided with a retreat adjacent to the first structure.

5. The foldable mechanism according to claim 1, wherein the first sub-mechanism has a first magnet, the second sub-mechanism has a second magnet, and a polarity of the first magnet is different from a polarity of the second magnet.

6. The foldable mechanism according to claim 1, wherein the first thickness is less than or equal to 9 mm.

7. A display device, comprising the foldable mechanism according to claim 1, wherein the display device comprises at least two states:
   a first folded state when the first sub-mechanism and the second sub-mechanism are rotated toward the opposite side of the front surface of each other; and
   a second unfolded state when the first sub-mechanism and the second sub-mechanism are rotated away from the opposite side of the front surface of each other;
   wherein an area of the display device in the second unfolded state is greater than an area of the display device in the first folded state.

8. The display device according to claim 7, wherein when the display device is in the folded state, the first structure and the second structure overlap each other.

9. The display device according to claim 7, wherein the first structure further comprises a third boss having a third thickness; and
   the third boss is located between the first slope and the second structure, and the third thickness is less than the second thickness.

10. The display device according to claim 7, wherein the second thickness ranges from 2 mm to 8 mm.

11. The display device according to claim 8, wherein the first boss is provided with a retreat adjacent to the first structure.

12. The display device according to claim 8, wherein the first sub-mechanism has a first magnet, the second sub-mechanism has a second magnet, and a polarity of the first magnet is different from a polarity of the second magnet.

13. The display device according to claim 8, wherein the first thickness is less than or equal to 9 mm.

14. An electronic equipment, comprising:
   a flexible display screen and the foldable mechanism according to claim 1;
   wherein the flexible display screen is attached to a front surface and a side surface of the foldable mechanism, and the front surface is defined by the front surface of the first boss, the front surface of the first structure, and the front surface of the second structure.

15. The electronic equipment according to claim 14, wherein the first structure further comprises a second boss having a second thickness; and
   the second boss is located between the first boss and the first slope, and the second thickness is less than the first thickness.

16. The electronic equipment according to claim 15, wherein the first structure further comprises a third boss having a third thickness; and
   the third boss is located between the first slope and the second structure, and the third thickness is less than the second thickness.

17. The electronic equipment according to claim 15, wherein the second thickness ranges from 2 mm to 8 mm.

18. The electronic equipment according to claim 14, wherein the first boss is provided with a retreat adjacent to the first structure.

* * * * *